Sept. 18, 1923.
J. E. MOORE
1,468,388
GROUND CLEARING AND AERATING MACHINE
Filed June 7, 1921   3 Sheets-Sheet 3
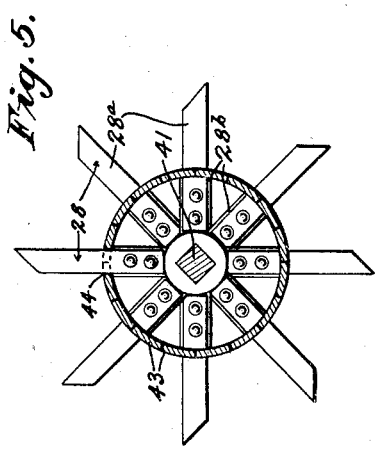
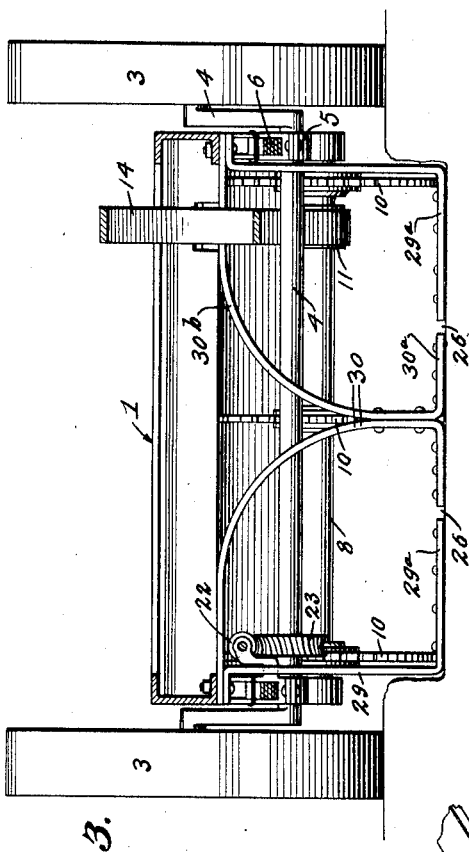
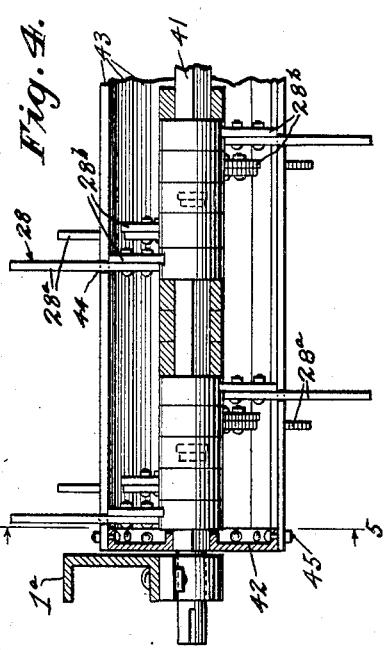
Inventor
James Elwood Moore
By Attilton Buck
Attorney Patented Sept. 18, 1923.

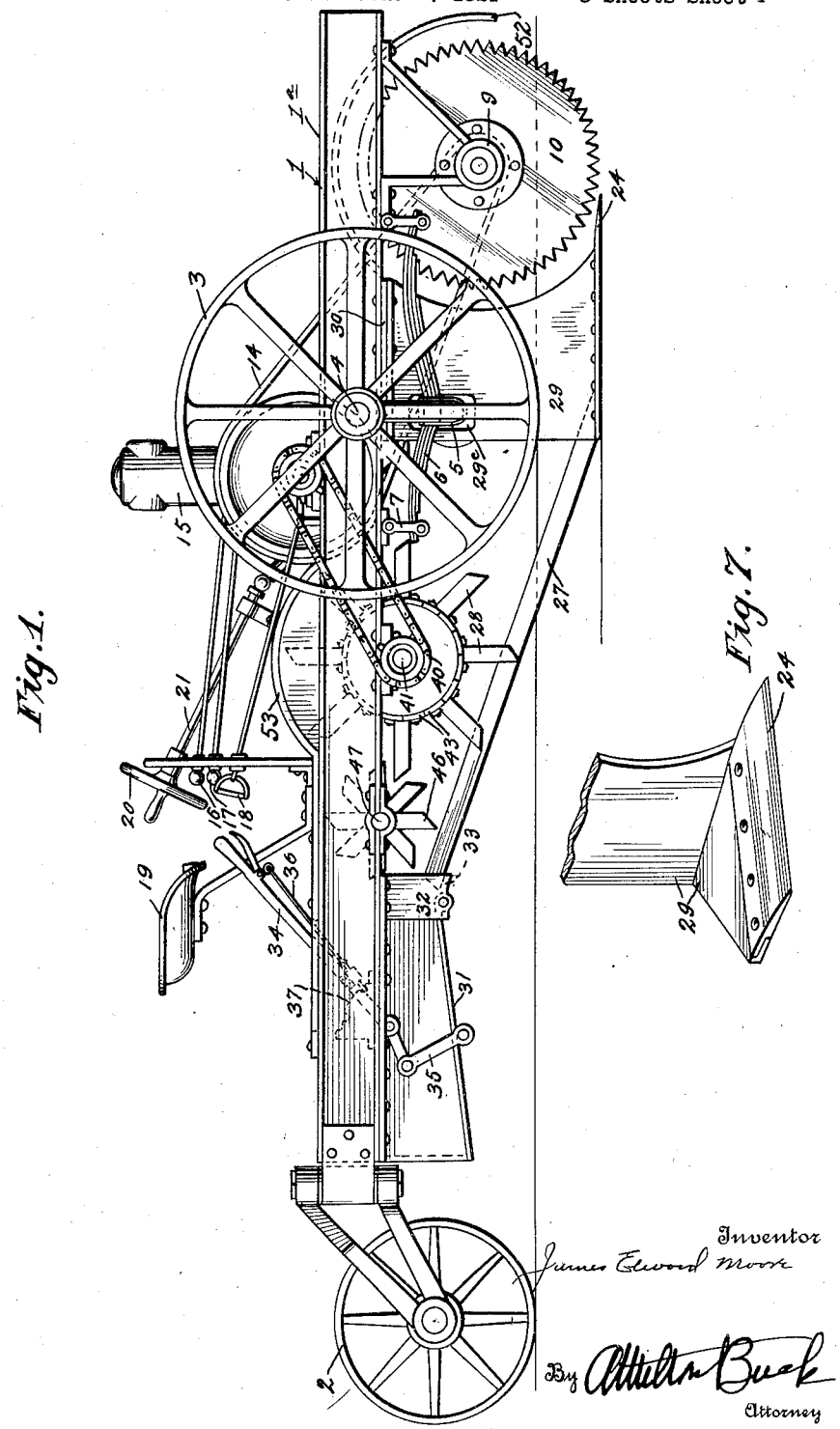

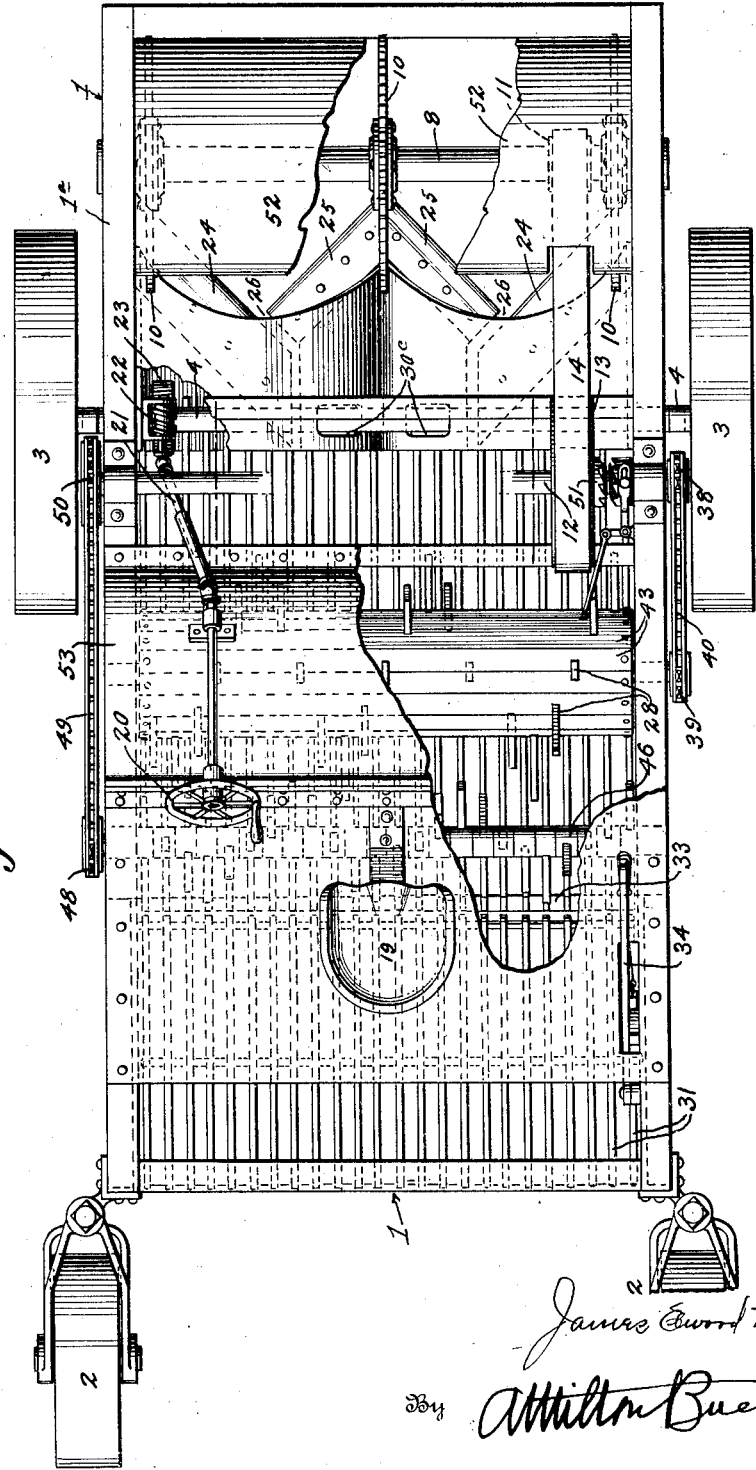

1,468,388

UNITED STATES PATENT OFFICE.

JAMES ELWOOD MOORE, OF SARASOTA, FLORIDA.

GROUND CLEARING AND AERATING MACHINE.

Application filed June 7, 1921. Serial No. 475,715.

*To all whom it may concern:*

Be it known that I, JAMES ELWOOD MOORE, a citizen of the United States, residing at Sarasota, in the county of Manatee and State of Florida, have invented certain new and useful Improvements in Ground Clearing and Aerating Machines, of which the following is a specification.

This invention relates to ground clearing and aerating machines, and more specifically to a machine for cutting and collecting roots, stumps, palmettos, corn-stalks, cotton-stalks and other plant growths.

One object of this invention is to provide a thoroughly practical and efficient machine for collecting and dumping plants and roots while aerating the land being cleared of the roots, etc.

A further object is to provide an easily operated means for vertically adjusting the front part of the machine so as to regulate the depth at which the horizontal and vertical cutters operate.

A further object is to provide an improved arrangement of cutting knives which clear themselves of roots that may be only part cut off.

A further object is to provide an improved beater that cannot become clogged, and which is exceedingly durable and easily repaired when its arms become worn or broken.

Other objects and advantages will be pointed out or implied in the following details of description, in connection with the accompanying drawings in which:

Fig. 1 is a side elevation of my land clearing and aerating machine.

Fig. 2 is a top plan view, parts being broken away for the purpose of disclosing other parts and for lack of sufficient space, the engine or motor and part of the driving shaft being omitted.

Fig. 3 is a transverse vertical sectional view.

Fig. 4 is a sectional detail illustrating the construction of the front or main beater or aerator.

Fig. 5 is a sectional view of the structure illustrated in Fig. 4, the section being taken along the line 5—5 of Fig. 4.

Fig. 6 is a perspective detail of one of the staves or strips which hold the beater-arms firmly in position and prevent clogging of the roots in the beater.

Fig. 7 is a perspective view illustrating the mounting of one of the horizontal knives or cutters.

Referring to these drawings in detail, in which similar reference characters correspond with similar parts throughout the several views, the invention consists in the construction and arrangment or combination of parts which will now be fully described as follows:

Broadly considered, the machine comprises a truck or running gear, one or more horizontal or substantially horizontal cutters, one or more substantially vertical cutters, one or more rotary beaters, a track which co-operates with the beater or beaters to elevate and convey the roots rearward, a collecting receptacle to receive and dump the roots, a motor for driving the vertical cutter and beater, and controlling devices such as will be described hereafter.

The truck comprises a main frame or chassis 1, a pair of rear wheels or casters 2, a pair of front wheels 3, a crank-axle 4, bearings 5 in which the axle 4 is rotatable, and leaf springs 6 with their connections 7.

At the front end of the frame 1, an axle 8 is mounted in bearings 9 and carries the vertical cutter or cutters 10 which may be either serrated, as illustrated, or may be of any other appropriate form. Moreover, these cutters may be either rotary or otherwise movable with relation to the frame 1 and roots for cutting the latter. However, in the present embodiment of the invention, they are secured to the shaft 8 and rotatable therewith. This shaft is provided with a driven wheel or pulley 11 which connects with a driving shaft 12 through the medium of a driving pulley 13 and a belt 14 or other endless transmission member.

The shaft 12 is directly connected to a motor 15, of any appropriate kind. The term "motor" is to be construed in its broadest definition, and is here conventionally shown as an internal combustion engine, its controlling handles being indicated at 16, 17 and 18, respectively, these handles being conveniently positioned with respect to a driver's seat 19.

A hand-wheel 20 is also positioned conveniently with respect to the driver's seat, and its jointed shaft 21 carries a worm 22 which meshes with a worm wheel 23 on the crank-axle 4, so that rotary motion may be imparted to this crank-axle by means of the hand-wheel 20. Obviously, when the intermediate portion of the crank-axle 4 has a rotary motion imparted thereto, the intermediate portion is moved forward or rearward with respect to its end portions, which carry the wheels 2, thereby raising the front portion of the frame 1 together with the cutters, beaters and track. This vertical adjustment of the cutters regulates the depth to which they extend into the ground, without changing the relation of the cutter with respect to the beater or beaters and track.

The horizontal cutters are illustrated at 24 and 25, the latter constituting a forwardly converging pair, while the cutters or blades 24 constitute a forwardly diverging pair. By referring to Fig. 2, it will be seen that the cutting edge of each blade 24 extends diagonally in rear of the corresponding blade 25 and is spaced therefrom, as indicated at 26, so that plants or roots will not become clogged between the cutters 24 and 25, in the event that such plants or roots are not entirely severed by the cutters, but will pass through the spaces or passages 26, and in many instances, the severing of such plants or roots will be completed by the upper and rearwardly inclined track-bars 27 and beater-arms 28. The cutters or blades 24 are removably secured by rivets, bolts or securing means, to horizontal portions 29ª of angular plates 29 whose upright portions are riveted or otherwise secured to the side bars 1ª of the frame 1, as indicated in Fig. 1. The intermediate cutters 25 are removably secured to plates 30 which are also secured to the bars 1ª, having their outer edges extending between these bars and the flanged upper edges of the plates 29 and being secured by the same rivets which secure the latter to the bars 1ª. The inner portions of the plates 30 extend downward and outward or horizontally to provide seats for the blades or cutters 25, as indicated at 30ª; and the intermediate portions of these plates are curved upward and outward from the portions 30 as indicated at 30ᵇ, while their outer edge portions extend horizontally between the beams 1ª and the plates 29, as previously explained, and as best shown in Fig. 3.

In the present arrangement of parts, two of the saws or cutters 10 are arranged adjacent to and extending forward of the front ends of the blades 24, while a third or intermediate saw or cutter 10 is disposed adjacent to the front ends of the cutters 25 and extend forwardly of these cutters. Therefore, the rotary cutters 10 sever the substantially horizontal roots before the cutters 24 and 25 sever the adjacent vertical or upright roots. The advantage of this arrangement arises from the fact that the blades 24 and 25 not only cut the upright roots, but also lift the earth containing the horizontal roots, and this lifting of the earth is made easier on account of the horizontal roots being first severed from the plants which stand out of the path being traveled by this machine.

By referring to Fig. 1, it will be seen that the lower cutting edges of the cutters 24, 25 and 10 are always substantially at the same depth of earth when in operation, because the cutting edges of the horizontal cutters extend approximately to the vertical center of the cutters 10; and this is true because the horizontal cutters are rigid with the frame 1 and immovable with respect to the axial centers of the cutters 10. While the cutters are here illustrated as having their lower surfaces exactly horizontal and plane, they will, in practice, have their front edges slightly inclined of the earth when the front end of the frame 1 is raised above its lowest position indicated in the drawings.

For the purpose of receiving the roots which have been severed by the cutters, a pivoted platform or grating 31 is carried by the rear portion of the frame 1, a pair of depending bearings 32 being provided with pivots of the platform 31. A supporting bar 33 has its ends secured to the bearings 32, and the rear ends of the track bars 27 are secured to this bar 33, while the front ends of these bars 27 are secured to the horizontal portions 29ª and 30ª of the plates which carry the cutters 24 and 25. Therefore, the bearings 32 and bars 27 brace the plates which carry the horizontal blades.

For the purpose of dumping the roots when a sufficient quantity has been gathered on the platform 31, a lever 34 is connected to this platform, through the medium of links 35, and this lever 34 is provided with a latch 36 which engages with a quadrant 37 for holding the platform in its substantially horizontal position. The lever 34 is convenient to the driver's seat 19, and by swinging this lever rearward, the rear end of the platform 31 is lowered so that the roots slide from this platform on to the ground, forming a pile which can be burned or conveniently loaded for removal from the ground being cleared.

Referring again to the beaters, it will be seen that the one which includes the arms 28 is driven by the shaft 12 through the medium of sprocket wheels 38 and 39 and a chain 40, the sprocket 39 being mounted on a shaft 41 which has an intermediate noncylindrical portion on which the arms 28 are secured against rotation with respect to the shaft. This beater is illustrated in detail in Figs. 4 and 5, and it will be seen that each arm 28 comprises two parts 28ª and 28ᵇ, respectively, the latter being formed integrally with a hub which is separate from the hubs of the other arms 28. Therefore, if any arm 28 becomes broken or worn out, it can be replaced by a similar arm by simply withdrawing it from the shaft 41 and then passing this shaft through the hub of the similar arm 28. However, if it is only the part 28ª which needs replacing, it is only necessary to remove the bolts which secure this part to the part 28ᵇ and attach the new part 28ª by means of these bolts. To prevent thread-like roots from becoming entangled with the bolts of the arms 28 or becoming wedged between the arms 28, and also to brace these arms, I provide a pair of disks 42 and an annular series of slats or staves 43, the latter being provided with notches or openings 44 through which the arms 28 extend, the ends of the slats 43 being removably secured to the disks 42 by means of bolts 45 which extend through the apertured ends of these slats and through apertured flanges of the disks 42. The inwardly extending bosses of the disks 43 abut against the hubs of the outer arm 28 and assist the staves 43 in preventing longitudinal movement of the arms 28.

A rear beater and conveyor element 46 includes a shaft 47 which is journaled in the frame 1 and provided with a sprocket 48. A chain 49 connects the sprocket 48 and a sprocket 50 on the shaft 12, therefore, this shaft 12 drives the beaters and the vertical cutters in unison. However, a clutch 51 is provided for throwing the front beater out of gear with the driving shaft 12, and a similar clutch (not shown) may be provided for throwing the rear beater and the vertical cutter out of gear with the motor.

As is clearly shown in Figures 1 and 2 the arms of the beater member 46 are staggered relative to the arms of the beater member 28 and are of such length as to overlap the ends of the latter arms. Inasmuch as both of the beater members revolve in the same direction, due to their chain connections with the shaft 12, the said overlapping portions of the arms will be traveling in opposite directions with the result that they will coact to further cut or sever the roots of the plants. The arms of the beater member 46 will furthermore act to disengage any roots which may have lodged upon the arms of the beater 28, thereby serving as a cleaner for the last mentioned beater.

A hood or guard 52 is provided for the vertical cutters 10, and a hood or guard 53 is provided for the front and rear beaters.

The plates 29 and 30 are apertured at 29ᶜ and 30ᶜ for permitting the crank-axle 4 to pass through these plates and to have vertical movement relative thereto. By this means, the wheels 3 can pass over stumps, sticks, stones and other obstacles by simply deflecting the springs 6, without raising the front portion of the frame, so that the blades or cutters remain extended into the ground while the wheels pass over the obstruction. On the other hand, when the machine passes over a depression in the ground, the springs 6 permit the wheels to enter the depression and continue to support or partially support the front part of the machine while it passes over such depression.

Any appropriate means may be employed for drawing or propelling the machine, and when it is propelled while the motor 15 is operating, the vertical and horizontal cutters sever the roots which are in the path of the machine. These roots and the adjacent contiguous earth pass over the blades 24 and 25 and onto the track 27. As soon as they pass rearward sufficiently far, the front beater strikes them and frees the roots from the earth which clings to them. This earth falls between the bars of the track 27, and the roots are propelled rearward and upward on the bars 27 by the beater arms 28. The beater 46 now engages these roots and throws them onto the grating 31, at the same time discharging any of the earth which was clinging to them after they left the beater arms 28. When the platform or grating 31 has been filled, the driver can operate the lever 34 for dumping the roots on the ground.

The present invention may be employed in clearing land of cotton, corn, and other similar stalks and roots of comparatively small diameter, but it is more particularly adapted for operations on larger plants, especially pine and palmetto roots and stumps. By the use of the positively driven saw-toothed vertical cutters 10, the angularly disposed converging rigidly constructed horizontal cutters 24 and 25, the grate-like apron or track-bars 27, and the peculiarly constructed beaters 28 and 46, the former having its arms staggered and entering the spaces between said bars 27, and coacting with said bars, it is possible to effectively and quickly clear land of pine and palmetto stumps and roots as large as six, eight, and even ten inches in diameter.

Actual experiments have shown that machines employing smooth edged vertical cutters, even when forced into the ground under weights of as much as two tons, are wholly ineffective for severing roots of such dimensions, the said cutters merely rising and riding over such roots. Furthermore, the machines which have been heretofore proposed, due to the construction of their beaters and aprons, such as 27, have been incapable of handling such heavy roots and stumps, and removing the earth therefrom.

On the other hand, the present invention provides a machine having elements which effectively sever and remove the earth from palmetto and pine roots of the dimensions above mentioned; the beaters being so designed and constructed as to permit large pieces of severed roots to be moved when in transverse, longitudinal, or diagonal positions. The arms of the beaters further so engage these large roots as to effectively remove therefrom substantially all of the earth adhering thereto, which earth is forced by the said arms through the spaces between the bars 27, depositing it loosely on the surface of the ground over which the machine is travelling. It thus results that the ground is not only cleared of the stumps and roots, but also aerated, as will be readily apparent.

It is not intended to limit this invention to the exact details of construction and arrangement illustrated, but changes may be made within the scope of the inventive ideas as implied and claimed.

What I claim as my invention is:

1. In a device of the class described, the combination of a frame mounted to travel over the ground; a substantially horizontal root cutter mounted on said frame for travel below the surface of the ground, and comprising a plurality of pairs of converging stationary blades, a portion of one blade of each pair extending behind its companion blade in spaced relation thereto; a substantially vertical cutter mounted on said frame in position to penetrate the ground and cooperate with said horizontal cutter for severing and disengaging plant roots from the ground; a motor on said frame; and means operatively connecting said motor with said vertical cutter for imparting a cutting movement to the latter.

2. In a device of the class described, the combination of a frame mounted to travel over the ground; a substantially horizontal root cutter mounted on said frame for travel below the surface of the ground, and comprising a plurality of pairs of converging stationary blades, a portion of one blade of each pair extending behind its companion blade; a substantially vertical rotary cutter mounted on said frame in a position to penetrate the ground and cooperate with said horizontal cutter for severing and disengaging plant roots from the ground; a plurality of spaced stationary bars extending from the rear edge of the horizontal cutter for receiving and supporting the roots and earth from said cutter; a rotary beater provided with substantially radial spaced arms adapted to pass between and coact with said stationary spaced bars to engage the roots and beat the earth therefrom; a motor on said frame; and means operatively connecting said motor with said beater and said vertical cutter for imparting rotary movement thereto.

3. In a device of the class described, the combination of a frame mounted to travel over the ground; a substantially horizontal root cutter mounted thereon for travel below the surface of the ground; a substantially vertical root cutter mounted on said frame in position to penetrate the ground and cooperate with said horizontal cutter for severing and disengaging plant roots from the ground; a plurality of spaced stationary bars extending from the rear edge of the horizontal cutter for receiving and supporting the roots and earth from said cutters; a rotary beater provided with substantially radial spaced arms adapted to pass between and coact with said stationary spaced bars to engage the roots and beat the earth therefrom; a second rotary beater provided with spaced radial arms staggered relatively to the arms of said first beater and overlapping portions of the same, whereby they may coact with the arms of said first beater to sever and disengage the roots from the latter; and means for rotating said beaters.

4. In a device of the class described, the combination of a frame mounted to travel over the ground; a substantially horizontal root cutter mounted on said frame for travel below the surface of the ground and comprising a plurality of pairs of converging stationary blades, a portion of one blade of each pair extending behind its companion blade; a substantially vertical rotary cutter mounted on said frame in position to penetrate the ground and cooperate with said horizontal cutter for severing and disengaging plant roots from the ground; a plurality of spaced stationary bars extending from the rear edge of the horizontal cutter for receiving and supporting the roots and earth from said cutters; a rotary beater provided with substantially radial spaced arms adapted to pass between and coact with said stationary spaced bars to engage the roots and beat the earth therefrom; a second rotary beater provided with radial arms staggered relative to the arms of said first beater and overlapping portions of the same whereby they may coact with the arms of said first beater to further sever and disengage said roots from said first beater; a motor on said frame; and connections between said motor and said rotary cutter and said beaters for rotating the latter.

5. A device for removing relatively large roots and the like from the ground comprising a frame; substantially horizontal and vertical cutter members adapted to enter the ground and to sever said large roots; and means for removing adhering earth from said severed portions, comprising a plurality of spaced bars over which said roots and earth may travel and beaters provided with staggered arms adapted to engage said roots and to pass between said spaced bars, to force the removed earth therethrough.

6. A device for removing relatively large roots and the like from the ground, comprising a frame; positively driven rotary toothed cutters carried by said frame adapted to enter the ground and to sever said large roots in a substantially vertical plane; converging fixed cutter members also carried by said frame adapted to sever said roots in a substantially horizontal plane; an apron member comprising a plurality of fixed spaced bars, adapted to receive said roots from said cutters; and a positively driven rotary beater provided with substantially rigid radial staggered arms, adapted to engage said roots and to remove the adhering earth therefrom, said arms being also adapted to pass between said spaced bars and to force said removed earth therethrough.

In testimony whereof I affix my signature.

JAMES ELWOOD MOORE.